Sept. 6, 1960  G. W. A. GREEN. ET AL  2,951,493
FLUID OPERATED GOVERNORS
Filed April 18, 1958  4 Sheets-Sheet 1

INVENTORS
GEORGE WILLFRID ACLAND GREEN,
GERALD BROOME FOX,
JOHN ELLIOTT NEW,

By John B. Brady
Attorney

Sept. 6, 1960  G. W. A. GREEN ET AL  2,951,493
FLUID OPERATED GOVERNORS

Filed April 18, 1958  4 Sheets-Sheet 3

INVENTORS
GEORGE WILLFRID ACLAND GREEN,
GERALD BROOME FOX,
JOHN ELLIOTT NEW,

By John B. Grady
Attorney

United States Patent Office 2,951,493
Patented Sept. 6, 1960

2,951,493

FLUID OPERATED GOVERNORS

George Wilfrid Acland Green, Gerald Broome Fox, and John Elliott New, all of Englefield Green, Egham, England; said New assignor to said Green and said Fox Filed Apr. 18, 1958, Ser. No. 729,439

Claims priority, application Great Britain Apr. 29, 1957

6 Claims. (Cl. 137—36)

This invention relates to fluid operated governors for prime movers, particularly governors for fuel injection internal combustion engines, of the kind adapted to produce a flow of fluid substantially proportional to the speed of the prime mover and having in the path of the fluid flow a valve that sets up a variable back pressure dependent on the prime mover speed, said back pressure being transmitted to a spring-loaded plunger whose movement in response to these pressure changes adjusts a member for controlling the torque of the prime mover.

In this specification the terms "run-up," "control curve," "speed or speeder setting," "speeder," "rate of run-up," and "power" are used and are defined as follows:

"Run-up": This is the difference in speed of the prime mover allowed by the governor between steady running at full torque and steady running under no torque, and may be expressed as a percentage of full torque speed or as r.p.m.

"Control curve": With a particular adjustment of the governor there is a fixed relationship under steady conditions between torque and speed and this relationship, plotted as a graph of torque v. speed, is a control curve.

"Speeder setting": Governors usually have a means by which the full torque speed may be adjusted while the prime mover is running; each such adjustment is referred to as a speeder setting and is associated with a particular control curve. The speeder setting may be specified by the corresponding full torque speed. The "speeder" is the member by which the speed setting of a variable speed governor is selected.

"Rate of run-up": If the control curve is straight the rate of run-up is uniform and is equal to the slope of the control curve; if the control curve is not straight, the rate of run-up is not uniform throughout the torque range but is equal at any point on the curve to the slope of the tangent to the curve at that point.

"The power": This is the work available from the governor when the output member moves from one extreme end of its travel to the other.

Broadly stated the invention provides a fluid operated speed governor of the kind set forth in the opening paragraph hereof in which the valve controls a graded port or ports and is resiliently loaded by a manual speed control as through a spring the manual adjustment of which control adjusts the speed of the prime mover and in conjunction with the resiliently connected valve and the graded port or ports allows the run-up to be given any practically desirable value at any selected point throughout the speed range without fixing the value of the run-up at other points.

The invention will be further described with reference to Figs. 1 to 15 of the accompanying drawings, in which.

Figure 1:
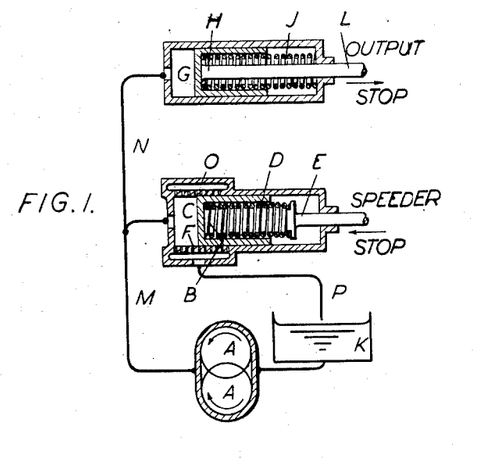
Fig. 1 is a schematic diagram showing the working circuit of the fluid operated governor of our invention, the valves constituting the governor being shown in transverse section.

Fig. 1 shows the working circuit of the governor in diagrammatic form. A pump AA driven by the prime mover to be governed draws fluid from a tank K and delivers it through a conduit M to a cylinder C, in which works a piston valve B controlled by a spring D. An abutment E, adjustable by hand, constitutes the speeder and controls the load on the spring D. Ports F in the wall of the cylinder C allow fluid to escape to a surrounding annulus O, whence it returns by a conduit P to the tank K. The back pressure set up by the flow through the ports F is conveyed by a conduit N to a cylinder G in which works a plunger H loaded by spring J. A rod L attached to the plunger H transmits its movement either directly or indirectly to the torque-controlling member of the prime mover.

The flow set up by the pump AA is approximately proportional, and is here assumed to be exactly proportional, to the speed of the prime mover.

Control curves

Assume for convenience that the pressure in the cylinder G required to hold the plunger H in the full torque position (towards the left of its travel) is 100. To reduce torque, the pressure in the cylinder G must increase so as to compress the spring J and move the plunger H to the right.

Assume also that the full rated speed of the prime mover at full torque is 100 and that under these conditions the position of the valve $b$ is 100 measured from its position when the ports F are completely closed, this last being the zero position. Then at position 100 of the valve B, the spring D must exert a pressure of 100 on the valve B.

If now the load torque on the prime mover is reduced, its speed rises and consequently the pressure drop at the ports F increases. The valve B is pushed to the right, compressing the spring D and increasing the pressure of the fluid in the cylinder G. This increase is transmitted to the plunger H so that it moves to the right to reduce the torque of the prime mover. This continues until a new steady state is reached at a higher speed.

The rate of the spring D may be selected to be 1.0, so that a movement of the valve B of 100 produces a pressure of 100 due to the spring D.

If the length of the spring D is $d$ at a pressure of 100, then the zero position of the abutment E is to the right of the zero position of the valve B by a distance $d$. When the abutment E is in its zero position, the pressure will be 100 with the valve B in its zero position, and it will also be 100 when the abutment E and the valve B are both in positions 100.

The area of the port F is considered to be 100 when the valve B is at position 100. When the prime mover exerts full torque at speed 100 the flow velocity through the port F is therefore 1.0.

The port is shown on Fig. 1 as a series of holes, but for the purpose of calculation, the port may be considered to take the form of a parallel slot of width 1.0. Let it be assumed that the abutment E is set at 100 and the valve B is at position $x$.

The pressure exerted by the spring D is therefore $x$ and the flow velocity is $$\sqrt{\frac{x}{100}}$$

The port area is $x$. The flow rate is therefore $$x \times \sqrt{\frac{x}{100}} = \frac{x^{1.5}}{10}$$

Figure 2:
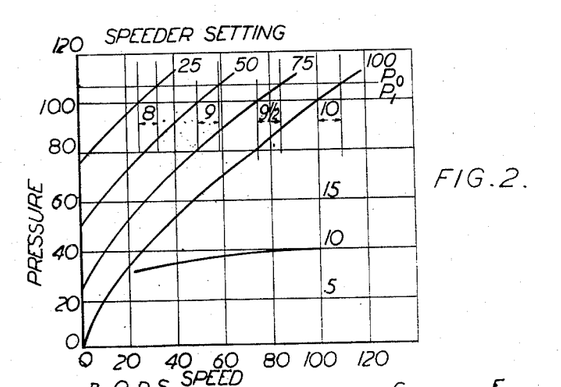
Fig. 2 is a control curve graph for the governor of our invention showing the relationship of torque v. speed and particularly showing the relationships of pressure v. speed, speeder setting v. pressure and run-up v. speed for the governor working circuit.

This expression is plotted as a graph on Fig. 2 as pressure v. flow and marked 100. Since flow is proportional to speed, Fig. 2 is also a graph of pressure v. speed. If the prime mover starts from rest and accelerates, the pressure follows this graph. The plunger H remains at the full torque position until the pressure reaches 100. It then starts to move to the right to reduce the torque of the prime mover.

Suppose the prime mover is required to have a run-up of 10. This means that the torque must be 0 at speed 110. Fig. 2 shows that at this speed, the pressure is 107.

The rate of the spring J must therefore be chosen so that the plunger H takes up its no-torque position at a pressure of 107. If the movement of the plunger H from full torque to no-torque position is 100, the rate of the spring J must be 7/100. The "useful pressure range" is 7.

Horizontal lines drawn at pressures 100 and 107 are marked $P_1$ and $P_0$ on Fig. 2, $P_1$ being the pressure at full torque and $P_0$ that at no torque. The speeds at which any control curve cuts these two lines are the full torque and no torque speeds respectively for that speeder setting.

If, as is usually approximately the case, the torque of the prime mover is proportional to the position of the plunger H, the parts of these pressure graphs lying between lines $P_1$ and $P_0$ constitute control curves.

Speed control

If now the abutment or speeder E is set to 75, the pressure will be 25 when the valve B is at position 0, and at position $x$ of the valve B the pressure will be $$x + 25$$

The expression for flow is now $$x\sqrt{\frac{x+25}{100}}$$

This graph is plotted on Fig. 2 and marked 75. The full torque speed is 75 and the no torque speed is 85. The run-up is again approximately 10. In the same way, graphs are drawn for speeder settings of 50 and 25. In these cases the run-ups are approximately 9 and 8 respectively. The graph of run-up v. speed is plotted on the same Fig. 2.

Effect of spring rate

Consider the effect of doubling the rate of the spring D whilst retaining all other conditions unchanged, including the length $d$. The spring D now exerts no load from $x=0$ to $x=50$. Thereafter $$\text{Pressure} = 2(x-50)$$

so that when the valve B is at position 100, the pressure is 100.

$$\text{Flow} = x\sqrt{2\left(\frac{x-50}{100}\right)} = \frac{x}{10}\sqrt{2(x-50)}$$

Figure 3:
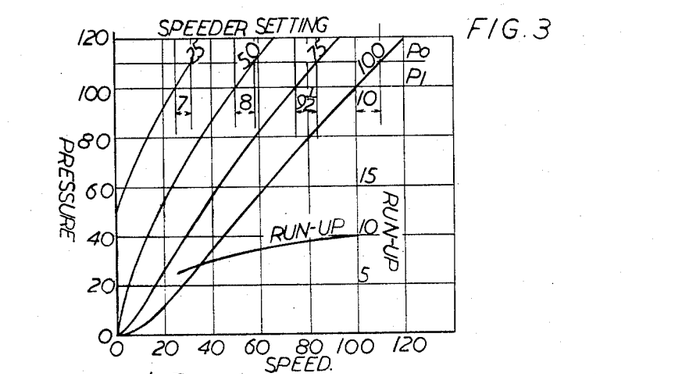
Fig. 3 is a control curve graph, similar to that shown in Fig. 2, showing the relationship between torque and speed with a different spring rate than used for the graph of Fig. 2.

This graph is plotted in the form of pressure v. speed on Fig. 3 and is marked 100. It shows that for a run-up of 10, the pressure rise must be 10 and the rate of spring J must therefore be 10/100.

The "useful pressure range" is therefore 10.

The corresponding graphs for speeder settings of 75, 50 and 25 are calculated as before, the formulae being:

$$\text{Flow} = \frac{x}{10}\sqrt{2(x-25)}$$

at 75 setting. Pressure $= 2(x-25)$ $$\text{Flow} = \frac{x}{10}\sqrt{2x}$$

at 50 setting. Pressure $= 2x$ $$\text{Flow} = \frac{x}{10}\sqrt{2(x+25)}$$

at 25 setting. Pressure $= 2(x+25)$

These also are plotted on Fig. 3 and marked respectively 75, 50 and 25. Run-up is again plotted v. speed and it is seen that the run-up decreases more steeply with speed than for a spring rate 1.0.

Run-up and speed

In the cases so far investigated, the run-up decreases with falling speed. To meet the requirement for an increase of run-up with falling speed the port F (Fig. 1) is made in the form of a tapered slot, wider towards the zero (left hand) end.

Taking the case of a spring with the rate of 1.0, assume a slot whose width varies uniformly from 1.6 at the zero end to 0.4 at the 100 (right hand) end.

The total port area is unaltered at $$\frac{1.6+0.4}{2} \times 100 = 100$$

At the position $x$ of the valve B, the port width is $$1.6 - \frac{1.2x}{100}$$

The mean width of the part of the slot exposed with the valve B at position $x$ is $$1.6 - \frac{0.6x}{100} = 1.6 - \frac{6x}{1,000}$$

The area of port exposed is therefore $$1.6x - \frac{6}{1,000}x^2$$

With the speeder E set at 100, the pressure is $x$ and the flow =

$$\frac{1}{10}\left(1.6x^{1.5} - \frac{6}{1,000}x^{2.5}\right)$$

Figure 4:
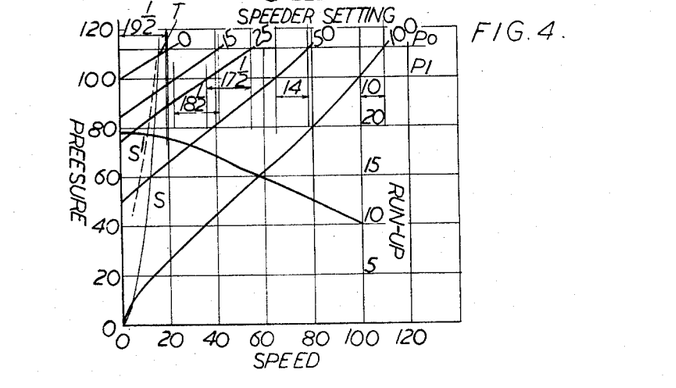
Fig. 4 is a control curve graph similar to Figs. 1 and 2 but showing the relationship of torque and speed at various speeder settings, and run-up v. speed, for a different configuration of governor escape port.

This graph is plotted in Fig. 4 and it can be seen that the pressure rise for a run-up of 10 is 12. The rate of the spring J must in this cause be $12/100$, and the useful pressure range is 12.

With the speeder set at 50, the pressure at position $x$ of the plunger valve B is $x+50$ and the flow formula becomes $$\text{Flow} = \frac{1}{10}\left(1.6x - \frac{6}{1,000}x^2\right)\sqrt{x+50}$$

and similarly for the other speeder settings. The corresponding graphs are plotted on Fig. 4 for speeder settings of 50, 25, 15 and 0. They show that the run-up increases with falling speed.

To meet the requirement for the run-up to be proportional or approximately proportional to full torque speed, the port F may be tapered in the opposite sense, i.e. wider at the right hand end than at the zero end.

In this way it is possible to produce families of control curves having any required characteristics as regards change of slope with speeder setting.

*Variable run-up*

Figures 5, 6:
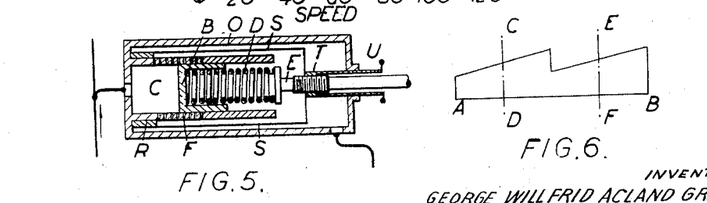
Fig. 5 is a transverse sectional view showing a modified form of one of the governor valves shown in Fig. 1 which allows varying the run-up without varying full torque speed.
Fig. 6 is a diagrammatic view showing the configuration of the escape ports of the speed governor.

In order to vary run-up without varying the full torque speed, the cylinder C and the valve B of Fig. 1 are modified as shown on Fig. 5. The run-up at a particular speeder setting depends on the rate at which the port area of the port F increases with movement of the valve B, whereas the speed depends on the total port area exposed.

The annular space O surrounding the cylinder C is enlarged and a slidable sleeve R is fitted to the outside of the cylinder so that by sliding it to the right, part of the area of port F can be blanked off.

Again considering the port F to consist of a slot, its width is made as indicated in Fig. 6. In this figure AB is the total length of the port; its width being a maximum at the right hand end and tapering to a minimum at the middle. The left hand half is an exact reproduction of the right hand half as shown. The line CD represents the right hand end of sleeve R and the line EF, the left hand end of the valve B, then the port area exposed is that between lines CD and EF. The sleeve R is coupled by rods S to a cross head T formed with an internal thread engaging an external thread on the speeder rod E. The cross head T carries a sleeve surrounding the speeder rod E and fitted at its right hand end with a handwheel U. If now the speeder rod E is moved axially, the sleeve R moves with it and the total port area is unaltered so that the speed is not affected. On the other hand, the rate of opening of the port F with movement of the valve B under the action of the hydraulic pressure and the spring D is proportional to the width of the port at line EF, and can thus be adjusted at will.

The run-up is nearly proportional to the width of the port at the point where the valve B cuts it off and can thus be adjusted by sliding the speeder rod E.

If now the handwheel U is turned, the sleeve R is slid and the total port area exposed is altered, thus altering the speed.

*Failing safe*

The governor so far described does not fail safe since the spring J (Fig. 1) tends to push the torque control member to the full torque position. This disadvantage is overcome in either of two ways now to be described.

Figures 7, 9:
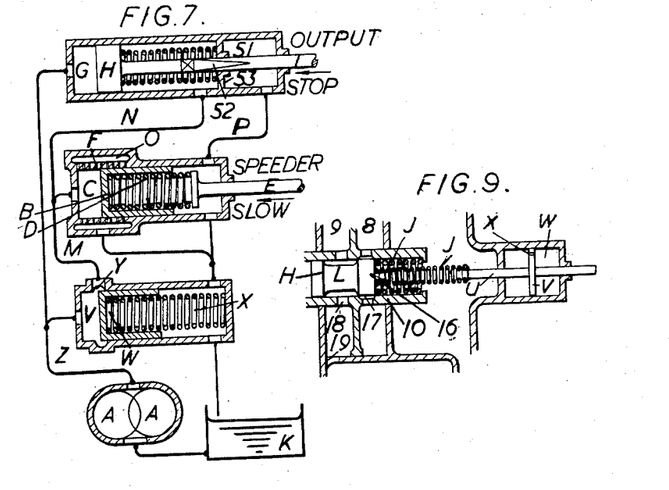
Fig. 7 is a schematic diagram similar to Fig. 1 showing the working circuit of a modified fluid-operated governor of our invention which is fail-safe.
Fig. 9 is a fragmentary, transverse sectional view showing a modified form of a portion of the governor of Fig. 8 which provides isochronous governing.

If the rod L is to be coupled direct to the torque controlling member of the prime mover, the circuit is modified to the double-acting form as shown in Fig. 7 and described in United States patent specification No. 2,445,113. The speed-sensing circuit is basically the same as that of Fig. 1 and corresponding parts bear corresponding references.

A pump AA, driven by the prime mover as before, discharges through a conduit Z to a release valve W working in cylinder V and loaded by a spring X. The spring X imposes a pressure of 200 on the valve W so that this pressure is maintained upstream of the valve and is transmitted by the conduit Z to the left hand side of the plunger H in the cylinder G. Fluid passing the release valve W enters an annulus Y and thence the conduit M leading it into the cylinder C. The construction and action of cylinder C and its associated parts are exactly as described in connection with Fig. 1, but the back pressure set up by the resistance of the port F is transmitted by the conduit N to the right hand side of plunger H, so that its effect is added to that of spring J, both being opposed to the pressure of 200 acting on the left hand side of the plunger H.

The governing action with this arrangement is identical with that of the circuit of Fig. 1 as explained in aforesaid patent specification but should the pump AA lose its working fluid, or should the drive from the prime mover fail, pressure throughout the circuit becomes atmospheric and the spring J pushes the rod L to the no-torque position so that the prime mover is brought to rest. Should the prime mover rotate in the reverse direction, the same action occurs.

If the output rod L is coupled to the torque controlling member of the prime mover through an hydraulic servo mechanism, the governor can be arranged to fail safe as described in the next section.

*Servo operation*

Figure 8:
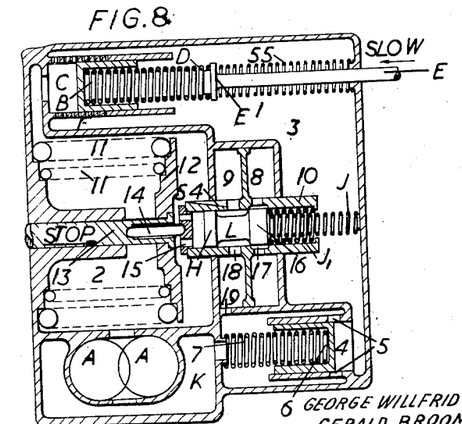
Fig. 8 is a transverse sectional view of another modified form of our invention in which the entire governor circuit mechanism is enclosed in a case.

In some cases, as previously stated, it is preferable to transmit the motion of the rod L to the torque controlling member of the prime mover through a servo mechanism. The governor circuit in this form is shown by Fig. 8. Here the whole mechanism is shown enclosed in a case.

The gear pump AA draws fluid from a suction chamber K, considered to be at zero pressure, and discharges it to a space 2. The pressure in this space 2 is designated $P_2$. Fluid flows thence into the cylinder C, where it acts on the valve B, loaded by the spring D. Port F, as shown in this figure consists of a series of holes which are uncovered progressively as the valve B moves to the right against the spring D. The abutment E for the spring D constitutes the speeder, being adjustable by hand for speed selection. Fluid passing the port F flows into a space 3, whence it enters a power cylinder 4. Here it passes through ports 5, controlled by a power valve 6, into the suction space K. The power valve 6 is loaded by a spring 7 so that the space 3 upstream of it is maintained at an approximately fixed pressure $P_1$. Between the spaces 2 and 3 is arranged a servo cylinder 8, in which works a servo piston 9, carried on a hollow piston rod 10.

Servo springs 11, 11 bear at the left hand end on the governor casing and at the right hand end on a spring plate 12 carried on an output rod 13. The load of the springs 11 is transmitted by a push rod 14 and a cap 15 to the hollow servo piston rod 10, so that the output rod 13 and the servo piston 9 are constantly biassed to the right. Sliding in the piston rod 10 is the pilot valve L, having at its left hand end a plunger H and at its right hand end a piston valve 16. The valve 16 controls ports 17, giving access in the usual way to the right hand end of the servo cylinder. Other ports 18 in the piston rod 10 communicate between the left hand end of the servo cylinder and the space in the rod confined between the plunger H and the valve 16.

A port 19 ensures that the left hand end of the servo cylinder is always at zero pressure.

Holes through the cap 15 enable the delivery pressure $P_2$ of the pump AA in the space 2 to act on the left hand end of the plunger H. The speed sensing circuit of the governor consisting of the cylinder C, the plunger B, the spring D, the speeder E, and the ports F establishes a pressure drop from the space 2 to the space 3 as explained in connection with Fig. 1. This pressure difference, $P_2-P_1$, is applied to the two ends of the pilot valve L tending to force it to the right. It thus corresponds to plunger H on Fig. 1. Corresponding to the spring J (the "governor" spring) of Fig. 1 the pilot valve L is biassed to the left by the governor spring J, bearing on the right hand end of the pilot valve and abutting on the casing. It is under certain circumstances convenient to make the spring J comparatively light, and to supplement it by an auxiliary spring $J_1$, bearing at its left hand end on the pilot valve L and at its right hand end on a ledge formed in the bore of the piston rod 10.

Under conditions of steady running, the valve 16 must always close the port 17, so that the position of the pilot valve L in relation to the piston rod, does not vary. The length of spring $J_1$, and consequently its load, are therefore constant in any steady state. Thus its rate does not affect the run-up which is determined solely by the rate of spring J.

The rate of spring $J_1$ determines the amount of opening of the port 17 under the influence of a given change in pressure $P_2$, and therefore of the rate of response of the servo piston.

The load on the springs 11 is preferably arranged so that at mid-travel, it is half that due to pressure $P_1$ acting on the servo piston.

If the pressure $P_2$ falls, owing to a reduction in speed of the prime mover, the pilot valve moves to the left and admits fluid at pressure $P_1$ to the right hand side of the piston 9. The piston moves to the left, pushing rod 13 in the direction to increase the torque of the prime mover so that its speed increases till a steady state is again restored.

In case of the reverse action, fluid is discharged from the right hand side of the piston 9, which moves to the right under the action of the spring 11, and this moves the rod 13 to reduce the torque of the prime mover.

If desired, the power valve 6 may be given a considerable travel to the right after closure of the ports 5, so that in case of sudden demand for pressure fluid to operate the servo piston, the displacement of the valve can be added to that of the pump.

If preferred, the above described circuit may be modified by using two separate pumps, a small precision pump giving an output as nearly as possible proportional to engine speed to feed the speed-sensitive circuit and a comparatively rough one to supply pressure to work the servo-mechanism.

Isochronous governing

Isochronous governing may be obtained by modifying the governor as shown on Fig. 9. The modifications are confined to the parts in the space 3 of Fig. 8. The corresponding parts where shown on Fig. 9 are given the same references so that they may be easily identified.

In the modified arrangement the valve L is acted on by the spring $J_1$ which abuts at the other end on a ledge formed in the end of the hollow piston rod 10 in the same way as in Fig. 8. Under steady conditions however, the spring $J_1$ takes the whole of the load on the plunger H, due to the difference of hydraulic pressure $P_2-P_1$ acting on the two ends of the pilot valve L.

The spring J of Fig. 8 is replaced by a spring $J_2$ which is unloaded under steady conditions. It is mounted at each end on a member having a helical groove which fits the turns of the spring and onto which the spring is threaded (often referred to as "snails") so that it will take either tension or compression. Any suitable alternative arrangement may be used, such as tension and compression springs, acting in opposition to one another. The left-hand snail is formed on an extension of the valve 16. The right-hand one is mounted on the rod $u$, carrying a piston $v$ which works in a dashpot $w$, restricted connection between the ends of which is allowed by a hole $x$ in piston $v$.

On a reduction of the load on the prime mover, resulting in an increase of its speed, pressure $P_2$ rises and pushes the pilot valve L to the right, thus compressing the springs $J_1$ and $J_2$. Owing to the delay imposed by the dashpot $w$, the right-hand end of the spring $J_2$ may be regarded as momentarily fixed. The first action of the governor is therefore exactly as described earlier; the prime mover tending to settle at a new and higher speed, giving a run-up sufficient to afford stable governing.

The load on the spring $J_2$ however tends to move the piston $v$ to the right, and this action continues until there is no load on the spring $J_2$. It is thus seen that a steady state can only be reached when the loading of both springs $J_1$ and $J_2$ is the same as it was before the change of load occurred. Pressure $P_2$ must therefore also be the same and this can only occur at the original speed. As the dashpot gradually allows the spring $J_2$ to relax, the speed slowly falls to its original value, but with the control rod 13 (of Fig. 8) in a new position corresponding to the reduced load.

On an increase of load the action is similar, but opposite.

The governor reacts in the same way to a movement of the speeder E of Fig. 8 as the original governor.

Anti-stalling device

For a variable speed engine having small flywheel effect and large free acceleration such as is used for road traction, excavators, etc., the governor would be adjusted to give a family of control curves such as those of Fig. 4. At low speeds the run-up is large and this is desirable from the point of view of stable idling.

Suppose that the engine were required to idle at a speed of 20 on the diagram, the speeder of the governor would be set to 0 and the governor would work along graph 0, cutting the no-torque line at a speed of approximately 20.

If at this setting full-load torque were applied, the engine would stall. Such stalling can however be prevented by fitting an adjustable stop to limit the movement of the valve B of Fig. 1 as shown in Fig. 10.

If load is applied when the engine is idling at a speed of 20, it will slow up along curve 0 of Fig. 4. Under the reduced flow of fluid resulting from the reduction in speed, the valve B will move to the left under the action of the spring D till the pressure drop at the ports balances the spring. If after the valve has moved a short distance it is stopped by a screw 2, ports F constitute a fixed orifice. The control curve will then be a parabola with its vertex at the origin of Fig. 4 and its axis on the pressure axis passing through speed 16, say, at pressure $P_1$ on that figure. It is marked S.

It is thus seen that application of load to the prime mover when it is idling at speed 20 will cause the speed to fall along curve 0 until it intersects curve S at a point whence it will follow curve S so that it can carry full T torque at, say, speed 16. The ability to carry full torque is of course subject to the ability of the prime mover to exert full torque at that speed.

Figure 10:
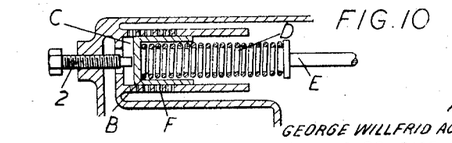
Fig. 10 is a transverse sectional view of a modified form of the speed control valve shown in Fig. 1 and particularly showing an adjustable stop applied to the valve to prevent stalling when full load torque is applied to the engine.

Should it be considered that control curve S is undesirably steep, a spring-loaded stop may be substituted for the positive stop 2 of Fig. 10, in which case control curve S will take some less steep form such as S'.

Temperature compensation

Any governor using a hydraulic speed sensing circuit is liable to be affected by changes in the temperature of the working fluid. In this governor the effect is two-fold:

A. A reduction in the viscosity of the fluid results in increased leakage at the various sliding fits.

B. Reduced density of the working fluid results in a reduced mass-flow.

Both effects will have a tendency to make the prime mover run faster with increased temperature of the working fluid.

In order to compensate for this change of speed, we make the gear pump a little larged than required by the design and by-pass the excess output through a valve. We place the valve under the control of a thermostat immersed in the working fluid, and we arrange that the opening of the valve, under thermostatic control at any temperature, is sufficient to by-pass the excess output of the pump at that temperature. The mass flow through the governor circuit can thus be maintained at an amount which will give a constant speed to the prime mover at a given speeder setting, irrespective of temperature variations of the working fluid, within the range which the device is designed to cover.

Protective devices

Figure 11:
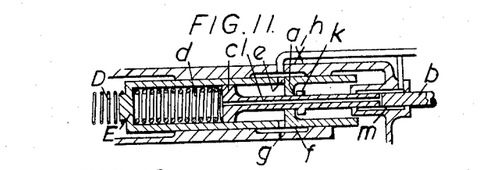
Fig. 11 is a fragmentary transverse sectional view of a modified arrangement of the speed control valve of the governor for reducing prime mover speed on occurrence of dangerous engine conditions.

In case of failure of lubrication, occurrence of excessive temperatures or other dangerous condition in the prime mover, the governor should be able to reduce speed and if necessary, stop the prime mover on receipt of a signal originated by such dangerous condition. The method by which we do so is illustrated in Fig. 11. The speeder E of Figs. 1, 7 or 8 is replaced by the hollow plunger E of Fig. 11, working in a bore in the governor casing. It is partially closed by a diaphragm $a$, through which works a rod $b$, having a piston $c$ at its left-hand end, fitting in the bore of the plunger E. Piston $c$ is biased to the right by the spring $d$ as shown. The space between the piston $c$ and the diaphragm $a$ is accessible by a port $e$ to an annulus $f$, which itself communicates through a restricted port $g$ with the space 3 of Fig. 8, subject to pressure $P_1$.

Another connection to the annulus $f$ leads to a cock $h$ and thence to the suction chamber K of Fig. 8. So long as the cock $h$ is closed, presure builds up and pushes the piston $c$ to the left, compressing the spring $d$ so that a shoulder $k$ on the rod $b$ rests against the diaphragm $a$. Under these circumstances, the rod $b$ and the plunger E act as one rigid piece and together constitute the speeder.

It may be arranged that the occurrence of one of the derangements against which the prime mover is to be protected transmits a signal which opens the cock $h$ partially or fully, according to the extent of the derangement. Pressure then escapes from the right hand side of piston $c$ so that the spring $d$ pushes the plunger E to the left into a position for reduced or zero speed. A bore $l$ through the rod $b$ puts the space containing the spring $d$ in communication with the annulus $m$ which is itself connected to the suction chamber, to prevent build-up of pressure in this space.

Torque limitation

In certain prime mover applications involving running the prime mover at a wide range of speeds, it is desirable to be able to limit the torque exerted by the prime mover as a function of its speed, the torque generally being reduced at the lower speeds.

A simple way of meeting this requirement would seem to be to provide a stop for the torque control member, this stop being actuated directly by the manual speeder. But such a simple solution is not acceptable as the actual speed of the prime mover may well be different from that for which the speed is set. The control must therefore be a function of the actual speed of the prime mover.

It will be seen on Fig. 8 that the torque of the prime mover can be limited by limiting the travel of the pilot valve L towards the left hand end of its stroke. We therefore limit the extension of the spring J by a stop, and pressure $P_2$ then prevents the valve H traveling beyond the point at which the spring is arrested.

Figure 12:
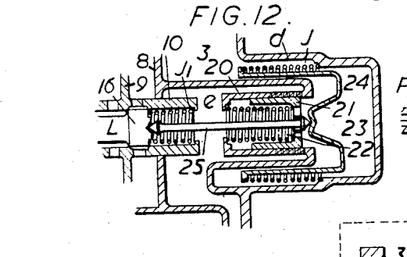
Fig. 12 is a fragmentary transverse sectional view showing a modified arrangement of a part of the governor circuit shown in Fig. 8.

On Fig. 12 a part of the governor circuit shown on Fig. 8 is re-drawn with the parts re-arranged. Corresponding parts are given the same letters as on the earlier diagram, and the circuit is identical hydraulically with the exception of the inclusion of a cylinder 20 in which works a plunger 21. This plunger is biassed to the right by a spring 22. The flow of fluid from the governor pump, after passing the valve B of Fig. 8 discharges into the space 3, then passes through the passage $d$ to space 23 to the right of plunger 21. Thence, it flows through ports in the wall of cylinder 20 into the space $e$, where it acts on the right hand end of the pilot valve L. The main flow continues into the power valve cylinder 4 of Fig. 8.

Spring J surrounds cylinder 20 and is carried by a spring plate 24 bearing on a push rod 25, the other end of which applies the load to the pilot valve L. A shoulder on the rod 25 rests on the face of the plunger 21 when both the pilot valve 16 and the plunger 21 are at the right hand end of their travel. Apart from the action of the plunger 21, the behaviour of the governor is exactly the same as that described in connection with Fig. 8. At low speeds, when the flow of fluid is small, the plunger 21 is pushed to the right hand end of its stroke by spring 22; in which case the movement of spring J will be limited to zero or some chosen amount less than full travel. As the flow increases with increasing speed of the prime mover, the pressure drop at the ports in the walls of the cylinder 20 increases so that the spring 22 is compressed and the plunger 21 is moved to the left till sufficient port area is exposed to allow the spring 22 to balance the pressure drop at the ports. By grading the ports, the plunger 21 may be made to take up any desired position as a function of speed, and thus allow the pilot valve L to move through any desired portion of its stroke, towards its left hand or full torque position. Auxiliary ports in the head of the plunger 21 may be incorporated as shown so that no torque can be exerted by the prime mover below some predetermined speed.

In the arrangement of Fig. 8 the springs J and $J_1$ are designed to give the required characteristics in relation to the pressure drop at port F. In the arrangement of Fig. 12 the pressure difference across the two ends of the pilot valve L is increased by the pressure drop at the ports in the wall of the cylinder 20. This of course varies with the position of the plunger 21, i.e. with speed. Springs J and $J_1$ are designed to allow for the additional pressure drop.

As described above, the motion of the torque limiting plunger 21 is applied directly to arrest the movement of the spring J, but it may be more convenient to place it elsewhere. If placed immediately downstream of the pump, and upstream of the speed sensing circuit (valve B etc.) or if placed immediately upstream of the power valve 6, the pressure drop occurring there would not affect the pressure difference acting on the pilot valve, and this would be an advantage.

In such case, the motion of the plunger 21 may be transmitted mechanically or hydraulically to the spring J.

Figure 13:
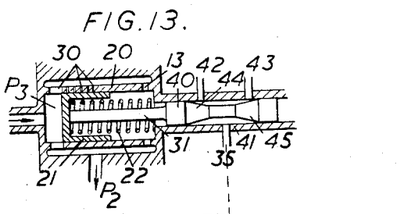
Figs. 13 and 14 are transverse sectional views showing a modified arrangement of the governor circuit portion of Fig. 12 for hydraulically transmitting the motion of the plunger to the spring J.
Figure 14:
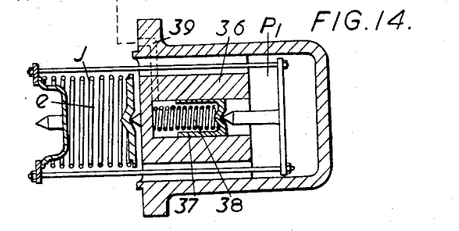

A method of hydraulic transmission is shown on Figs. 13 and 14.

The plunger, cylinder and spring bear the same numbers as on Fig. 12. The metering ports determining the position of the plunger are shown at 30, and the direction of the flow is shown by arrows.

Assuming that the mechanism is placed immediately downstream of the pump, the pressures in the circuit may be designated as follows:

Pressure set up by the power valve $6 = P_1$

Pressure drop at the port F of speed sensing circuit $= P_2 - P_1$

So that pressure upstream of the valve $B = P_2$

Pressure drop occurring at the plunger 21 of torque limiting circuit $= P_3 - P_2$ So that the pressure upstream of the plunger 21 which is also the discharge pressure of pump $AA = P_3$.

As shown in Fig. 13 the plunger 21 carries an extension 31, coupled to a piston valve 40, working in a barrel 41. Valve 40 has two opposed tapered parts, 44 and 45 arranged to restrict by variable amounts, the flow through two ports 42 and 43. Port 42 is coupled to space 3 of Fig. 8 at pressure $P_1$. Port 43 is coupled to space K at zero pressure. The pressure in the space between the two ports 42 and 43 depends on the position of the valve 40 and hence on the flow through the valve 21.

A port 35 connecting to the space between these two ports 42 and 43 taps off the intermediate pressure.

Arranged co-axially with the pilot valve and the spring J is another spring-loaded plunger as shown in Fig. 14. The barrel 36 is closed at its left hand end and supports the fixed abutment for the spring J. At its right hand end it is open to pressure $P_1$, reaching it from the space 3 of Fig. 8, designated e in Fig. 14. In the barrel 36, works a plunger 37, controlled by a spring 38. Pressure from conduit 35 of Fig. 13 is led via passage 39 Fig. 14 to the interior of the barrel 36, where it acts on the left hand side of the plunger 37. The parts may be so proportioned that the position taken up by plunger 37 is proportional to the position of the plunger 21, so that again the travel allowed to the spring J is proportional to the position of the plunger 21 and therefore to the desired maximum torque at any given speed.

By suitably adjusting the effective area of the port 30 exposed at each position of the plunger 21, and the profile of the tapers 44 and 45, the plunger 37 is made to take up any desired position as a function of the speed of the prime mover.

Should it be required that the maximum torque fall with increasing speed, this can be arranged by connecting the port 43 to pressure $P_1$ and the port 42 to suction pressure.

*Form of port*

Port F of Figs. 1, 7 and 8 is shown as a series of holes which may be varied in number and positioning to obtain the desired governing characteristics. In order to produce a reasonably steady rate of port opening, two or more rows of holes may be arranged, so that each hole begins to be uncovered before the previous one is fully uncovered. Alternatively, the left hand end of the valve B may be tapered where it masks the ports so that the travel necessary from the initial maskings to the complete closure of a hole is several times the diameter of the hole.

As a further alternative, a slot may be made in the cylinder wall in an axial direction, having a constant or variable width at different positions along its length.

*Shape of individual control curves*

The control curves given by the governor are very approximately straight over the working range between pressures $P_1$ and $P_0$ of Figs. 2, 3 and 4, i.e. the rate of run-up is constant. On the other hand, the minimum rate of run-up required for stability is less near the full torque end of the curve than near the no torque end. The curves given by the governor so far described can be modified to this form by the following expedient, and the total run-up required for stability under any given conditions thereby reduced. On Fig. 7 the rod L passes from the space containing the spring J through a diaphragm 53 to the space 51 which is at suction pressure. On the rod is formed a tapered flat 52, so that with the plunger H at the left hand end of its travel, the hole through which rod L passes, is closed, but as it moves towards the right, an increasing orifice area is opened, allowing flow of fluid from the working pressure to zero pressure.

Taking control curve 100 of Fig. 4, the run-up is 10. Spring J exerts a pressure of 100 at full torque at speed 100. At no torque at speed 110, it exerts a pressure of $100 - 12 = 88$.

Suppose it is required that while maintaining the rate of run-up at no torque, the total run-up is to be reduced to 5.

The no torque speed remains at 110 and the full torque speed is to be increased to 105.

Figure 15:
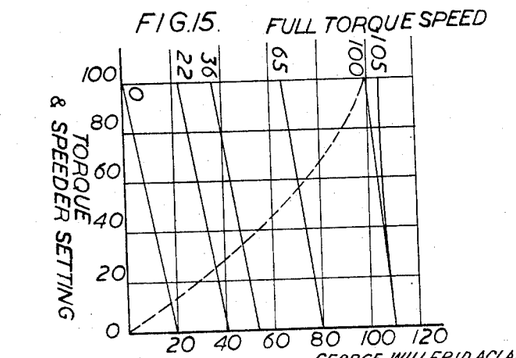
Fig. 15 is a governor control curve graph showing full torque speed plotted against torque and speeder setting at various values.

The parts of the graphs of Fig. 4 between pressures $P_1$ and $P_0$ covering the working range are re-plotted on Fig. 15. The horizontal scale is speed as before, but the vertical scale is torque. These graphs constitute a family of control curves.

For the case of graph 100, the new control curve must have the same slope as the present one at zero torque and must pass through the point, speed 105 and torque 100. A parabola having its vertex at this point and its axis on the line of 100 torque, since it can be made tangent to control curve 100 at the point of zero torque, fulfils these conditions.

If the flow between the rod L and the diaphragm 53 is 5% of that at the port F under full torque conditions, the flow required to generate the required pressure of 100 will be 5% greater, i.e. 105, and the speed of the prime mover must be 105.

A similar argument enables one to arrive at the flow area needed at the other points along the flat 52 in order that the governor may work to the parabolic control curve, and its dimensions can be adjusted accordingly.

In the case where servo transmission is employed, the same effect may be produced by providing a tapered flat or groove in the servo piston rod as shown at 54 on Fig. 8. This allows fluid to flow from the space 2 at pressure $P_2$ to the left hand side of the servo cylinder at zero pressure. In this case, when calculating the flow areas at the different sections, allowance must be made for the fact that the pressure drop is greater than that across the port F.

*Speed control*

Control of the speed of the prime mover is normally effected by sliding the rod E of Figs. 7 and 8. To reduce speed, the rod E must be moved to the left against the force of the spring D. If released, it would tend to move to the full speed position. Under certain conditions this may be inconvenient, in which case the spring 55 may be fitted as shown on Fig. 8 to bias the rod E to the low speed position.

*Stopping*

Considering Fig. 8 and the graphs of Fig. 4, when the speeder E is set to its zero position, the spring D maintains a pressure drop of 100, even with approximately no flow. By pushing the speeder a little further to a position at which it exerts pressure $P_0$ of Fig. 4, this pressure is maintained at approximately no flow, and the pilot valve is held in the no torque position until the speed of the prime mover falls to a value when leakage prevents the maintenance of full pressure. Under conditions applying to Fig. 4, the speeder position would be −12. Under these conditions the springs J and J₁ push the pilot valve 16 to its full torque position and the power valve 6 may be able to push the servo piston to the left, so that the prime mover may again exert a torque and it may be impossible to stop it. To prevent this, we arrange that when the speeder is pushed beyond its zero position to the "stop" position, a stop engages the plunger 6 to hold it in a position in which the ports 5 are partially open. Thus pressure in the space 3 falls immediately to zero.

Alternatively, a valve may be opened when the speeder is moved to the "stop" position, putting the space 3 into communication with the suction chamber K.

We claim:

1. In a fluid operated speed governor for a prime mover comprising a fluid flow circuit, a pump in said circuit to be driven by said prime mover thereby to produce a flow of fluid substantially proportional to the speed of said prime mover, a valve housing in said fluid flow circuit, a valve displaceable in said housing for setting up back pressure variations dependent on said speed, a spring loaded plunger influenced by said back pressure variations, and a torque controlling member movable by said plunger, the combination of graded port means through said housing controlled by said valve, spring means acting on said valve, and a manually operable speed controller resiliently loading said valve through said spring means, whereby manual adjustment of said speed controller in conjunction with said valve and said graded port means allows the prime mover run-up to be given any practically desirable value at any selected point throughout the speed range without fixing the value of the run-up at other points.

2. In a fluid operated speed governor for a prime mover comprising a fluid flow circuit, a pump in said circuit to be driven by said prime mover thereby to produce a flow of fluid substantially proportional to the speed of said prime mover, a valve housing in said fluid flow circuit, a valve displaceable in said housing for setting up back pressure variations dependent on said speed, a plunger influenced by said back pressure variations, a torque controlling member movable by said plunger, a servo cylinder between said pump and the fluid space about said housing, and a servo piston in said cylinder having a hollow piston rod, the combination of two springs working in parallel loading said plunger one of said springs abutting a fixed support and the other abutting said hollow servo piston rod, graded port means through said housing controlled by said valve, spring means acting on said valve, and a manually operable speed controller resiliently loading said valve through said spring means, whereby manual adjustment of said speed controller in conjunction with said valve and said graded port means allows the prime mover run-up to be given any practically desirable value at any selected point throughout the speed range without fixing the value of the run-up at other points.

3. In a fluid operated speed governor for a prime mover comprising a fluid flow circuit, a pump in said circuit to be driven by said prime mover thereby to produce a flow of fluid substantially proportional to the speed of said prime mover, a valve housing in said fluid flow circuit, a valve displaceable in said housing for setting up back pressure variations dependent on said speed, a spring loaded plunger influenced by said back pressure variations, a torque controlling member movable by said plunger, a servo cylinder between said pump and the fluid space about said housing, a servo piston in said servo cylinder having a hollow piston rod, a dashpot cylinder in line with said servo piston, a dashpot piston in said dashpot cylinder, and a rod extending from said dashpot piston, the combination of two springs loading said plunger one of said springs abutting said hollow servo piston rod and the other attached to said dashpot piston, graded port means through said housing controlled by said valve, spring means acting on said valve, and a manually operable speed controller resiliently loading said valve through said spring means, whereby manual adjustment of said speed controller in conjunction with said valve and said graded port means allows isochronous governing of the prime mover and allows the overrun to be given any practically desirable value at any selected point throughout the speed range without fixing the value of the overrun at other points.

4. In a fluid operated speed governor for a prime mover comprising a fluid flow circuit, a pump in said circuit to be driven by said prime mover thereby to produce a flow of fluid substantially proportional to the speed of said prime mover, a valve housing in said fluid flow circuit, a valve displaceable in said housing for setting up back pressure variations dependent on said speed, a spring loaded plunger influenced by said back pressure variations, and a torque controlling member movable by said plunger, the combination of ports through said housing controlled by said valve, a sleeve slidable on said valve housing for obturating said ports to a variable extent, spring means acting on said valve and a manually operable speed controller resiliently loading said valve through said spring means, whereby manual adjustment of said speed controller in conjunction with said sleeve and said ports allows the prime mover run-up to be adjusted to any practically desired value at any selected point throughout the speed range without altering the full torque speed.

5. In a fluid operated speed governor for a prime mover comprising a fluid flow circuit, a pump in said circuit to be driven by said prime mover thereby to produce a flow of fluid substantially proportional to the speed of said prime mover, a valve housing in said fluid flow circuit, a valve displaceable in said housing for setting up back pressure variations dependent on said speed, a spring loaded plunger influenced by said back pressure variations, and a torque controlling member movable by said plunger, the combination of graded port means through said housing controlled by said valve, spring means acting on said valve, a manually operable speed controller resiliently loading said valve through said spring means, and a fluid leakage path in parallel with said resiliently loaded valve having its flow area dependent on the position of said torque controlling member, whereby manual adjustment of said speed controller in conjunction with said valve and said graded port means allows the prime mover run-up to be given any practically desirable value at any selected point throughout the speed range without fixing the value of the run-up at other points and allows the rate of run-up at different points on the control curve to be varied as may be desirable.

6. In a fluid operated speed governor for a prime mover comprising a fluid flow circuit, a pump in said circuit to be driven by said prime mover thereby to produce a flow of fluid substantially proportional to the speed of said prime mover, a valve housing in said fluid flow circuit, a valve displaceable in said housing for setting up back pressure variations dependent on said speed, a spring loaded plunger influenced by said back pressure variations, and a torque controlling member movable by said plunger, the combination of graded port means through said housing controlled by said valve, spring means acting on said valve, a manually operable speed controller resiliently loading said valve through said spring means, a fluid leakage path in parallel with said resiliently loaded valve, and a heat-sensitive element controlling the fluid flow through said path, whereby manual adjustment of said speed controller in conjunction with said valve and said graded port means allows the prime mover run-up to be given any practically desirable value at any selected point throughout the speed range without fixing the value of the run-up at other points independently of the temperature of the working fluid in the circuit.

(References on following page)

References Cited in the file of this patent

UNITED STATES PATENTS

| | | |
|---|---|---|
| 772,294 | Ribourt | Oct. 11, 1904 |
| 778,399 | Brown | Dec. 27, 1904 |
| 1,347,276 | Johnson | July 20, 1920 |
| 1,566,995 | Standerwick | Dec. 22, 1925 |
| 1,961,842 | Broege | June 5, 1934 |
| 2,364,817 | Reggio | Dec. 12, 1944 |
| 2,392,262 | Ramsey | Jan. 1, 1946 |
| 2,445,113 | Green et al. | July 13, 1948 |
| 2,661,796 | Davies et al. | Dec. 8, 1953 |

FOREIGN PATENTS

| | | |
|---|---|---|
| 571,408 | Great Britain | Aug. 23, 1945 |